US011076321B2

(12) United States Patent
Narayanappa et al.

(10) Patent No.: US 11,076,321 B2
(45) Date of Patent: Jul. 27, 2021

(54) SELECTING 5G NON-STANDALONE ARCHITECTURE CAPABLE MME DURING REGISTRATION AND HANDOVER

(71) Applicant: Cisco Technology, Inc., San Jose, CA (US)

(72) Inventors: Raghavendra Narayanappa, Karnataka (IN); Sandeep Dasgupta, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/158,119

(22) Filed: Oct. 11, 2018

(65) Prior Publication Data

US 2020/0120550 A1     Apr. 16, 2020

(51) Int. Cl.
*H04W 36/00* (2009.01)
*H04L 29/06* (2006.01)
*H04W 8/22* (2009.01)
*H04W 28/02* (2009.01)
*H04W 36/26* (2009.01)

(52) U.S. Cl.
CPC ......... *H04W 36/0022* (2013.01); *H04L 69/22* (2013.01); *H04W 8/22* (2013.01); *H04W 28/0215* (2013.01); *H04W 36/26* (2013.01)

(58) Field of Classification Search
CPC ..... H04L 61/1511; H04W 8/08; H04W 24/02; H04W 76/12; H04W 84/045
See application file for complete search history.

(56) References Cited

U.S. PATENT DOCUMENTS

| | | | |
|---|---|---|---|
| 9,357,014 B2 | 5/2016 | Shamilian et al. | |
| 9,374,777 B2 | 6/2016 | Salot et al. | |
| 9,642,077 B2 | 5/2017 | Mathai et al. | |
| 9,749,773 B2 | 8/2017 | Kodaypak et al. | |
| 2010/0080186 A1* | 4/2010 | Guo | H04W 28/08 370/329 |
| 2010/0291943 A1* | 11/2010 | Mihaly | H04L 29/12066 455/450 |
| 2010/0296453 A1* | 11/2010 | Grahn | H04L 29/12066 370/328 |
| 2012/0110191 A1* | 5/2012 | Johansson | H04L 12/1403 709/227 |
| 2013/0258943 A1* | 10/2013 | Madaiah | H04W 24/02 370/315 |

(Continued)

FOREIGN PATENT DOCUMENTS

EP          3193531 A1      7/2017
WO    2017166252 A1     10/2017

(Continued)

OTHER PUBLICATIONS

Cisco Technology, Inc., "5G NSA for MME", Sep. 2018, pp. 1-22.

(Continued)

*Primary Examiner* — Jamal Javaid (57) ABSTRACT

In one embodiment, a method is performed. A mobility management entity (MME) may determine a network capability. The MME may query a domain name server (DNS) for a plurality of candidate MMEs having the network capability. The MME may select a target MME from the plurality of candidate MMEs.

20 Claims, 7 Drawing Sheets

(56) References Cited

U.S. PATENT DOCUMENTS

| | | | |
|---|---|---|---|
| 2016/0174120 A1* | 6/2016 | Zembutsu | H04W 36/0005 370/331 |
| 2016/0192263 A1 | 6/2016 | Zembutsu et al. | |
| 2016/0262144 A1 | 9/2016 | Kitazoe et al. | |
| 2016/0366574 A1 | 12/2016 | Dahan et al. | |
| 2018/0027414 A1 | 1/2018 | Li et al. | |
| 2018/0288657 A1 | 10/2018 | Stojanovski et al. | |
| 2019/0069226 A1* | 2/2019 | Lee | H04B 17/30 |
| 2019/0116551 A1 | 4/2019 | Faccin et al. | |
| 2020/0053047 A1 | 2/2020 | Gambhir-Parekh | |

FOREIGN PATENT DOCUMENTS

| | | |
|---|---|---|
| WO | 2018006985 A1 | 1/2018 |
| WO | 2018008980 A1 | 1/2018 |

OTHER PUBLICATIONS

3GPP Organizational Partners, "3rd Generation Partnership Project; Technical Specification Group Core Network and Terminals; Domain Name System Procedures; Stage 3 (Release 15)", 3GPP TS 29.303 V15.1.0, Mar. 2018, 73 pages.

Samsung, "4G-5G Interworking", RAM-level and CN-level Interworking, https://images.samsung.com/is/content/samsung/p5/global/business/networks/insights/white-paper/4g-5g-interworking/global-networks-insight-49-5g-interworking-0.pdf, Jun. 2017, 17 pages.

GTI, "GTI Sub-6GHz 5G Device White Paper", V2.0, http://gtigroup.org/d/file/Resources/rep/2018-02-22/c9d31709d72643e625321d6f3724d761.pdf, Jan. 30, 2018, 82 pages.

NEC Corporation, "Making 5G a Reality", https://www.nec.com/en/global/solutions/nsp/5g_vision/doc/wp2018ar.pdf, Mar. 2018, 32 pages.

International Search Report and Written Opinion in counterpart International Application No. PCT/US2019/054429, dated Jan. 8, 2020, 18 pages.

3GPP, "3rd Generation Partnership Project; Technical Specification Group Core Network and Terminals; Domain Name System Procedures; Stage 3 (Release 15)", 3GPP TS 29.303 V15.3.0, Sep. 2018, 76 pages.

3GPP, "3rd Generation Partnership Project; Technical Specification Group Core Network and Terminals; 5G System—Phase 1; CT WG4 Aspects (Release 15)", 3GPP TR 29.891 V15.0.0, Dec. 2017, 146 pages.

NTT DOCOMO, "P-CR on Solution 1: Redirection after update location procedure", SA WG2 Meeting #104, S2-142879, Jul. 7-11, 2014, 9 pages.

3GPP Organizational Partners,"3rd Generation Partnership Project; Technical Specification Group Services and System Aspects; Architecture enhancements for non-3GPP accesses, (Release 15)", 3GPP TS 23.402 V15.3.0, Mar. 2018, 314 pages.

3GPP Organizational Partners, "3rd Generation Partnership Project; Technical Specification Group Services and System Aspects; System Architecture for the 5G System; Stage 2, (Release 15)", 3GPP TS 23.501 V15.3.0, Sep. 2018, 226 pages.

3GPP Organizational Partners, "3rd Generation Partnership Project; Technical Specification Group Services and System Aspects; Procedures for the 5G System; Stage 2, (Release 15)", 3GPP TS 23.502 V15.3.0, Sep. 2018, 330 pages.

3GPP Organizational Partners, "3rd Generation Partnership Project; Technical Specification Group Core Network and Terminals; Non-Access-Stratum (NAS) protocol for Evolved Packet System (EPS); Stage 3, (Release 15)", 3GPP TS 24.301 V15.4.0, Sep. 2018, 530 pages.

3GPP Organizational Partners, 3rd Generation Partnership Project; Technical Specification Group Core Network and Terminals; Domain Name System Procedures; Stage 3, (Release 15), 3GPP TS 29.303 V15.3.0, Sep. 2018, 76 pages.

Mirza Golam Kibria et al., "Next Generation New Radio Small Cell Enhancement: Architectural Options, Functionality and Performance Aspects", interarXiv: 1802.10267v1 [cs.IT], Feb. 28, 2018, 9 pages.

P. Mockapetris, "Domain Names—Concepts and Facilities", Network Working Group, Request for Comments: 1034, Obsoletes: RFCs 882, 883, 973, Nov. 1987, 55 pages.

P. Mockapetris, "Domain Names—Implementation and Specification", Network Working Group, Request for Comments: 1035, Obsoletes: RFCs 882, 883, 973, Nov. 1987, 55 pages.

M. Mealling, "Dynamic Delegation Discovery System (DDDS) Part Three: The Domain Name System (DNS) Database", Network Working Group, Request for Comments: 3403, Obsoletes: 2915, 2168, Category: Standards Track, Oct. 2002, 14 pages.

L. Daigle et al., "Domain-Based Application Service Location Using SRV RRs and the Dynamic Delegation Discovery Service (DDDS)", Network Working Group, Request for Comments: 3958, Category: Standards Track, Jan. 2005, 25 pages.

C. Kaufman et al., "Internet Key Exchange Protocol Version 2 (IKEv2)", Internet Engineering Task Force (IETF), Request for Comments: 5996, Obsoletes: 4306, 4718, Category: Standards Track, ISSN: 2070-1721, Sep. 2010, 138 pages.

5G Americas Whitepaper, "Wirelesstechnology Evolution Transition from 4G to 5G", 3GPP Releases 14 to 16, Oct. 2018, 271 pages.

* cited by examiner

SELECTING 5G NON-STANDALONE ARCHITECTURE CAPABLE MME DURING REGISTRATION AND HANDOVER

TECHNICAL FIELD

The present disclosure generally relates to wireless networking architecture.

BACKGROUND

In a long-term evolution (LTE) wireless network, a user equipment (UE) device may register with a eNodeB, which may select a mobility management entity (MME) to connect to the LTE core, when the UE device initially attaches to the network. The UE device may also register with a different eNodeB during handover and the target eNodeB may be in a traffic area not served by the original MME. In such a case, the session with the UE device may be moved from the original MME, e.g., a source MME, to another MME, e.g., a target MME, during a handover.

BRIEF DESCRIPTION OF THE DRAWINGS

For an understanding of aspects of various embodiments described herein and to show how they may be carried into effect, reference is made, by way of example only, to the accompanying drawings.

DESCRIPTION OF EXAMPLE EMBODIMENTS

Overview

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Various embodiments disclosed herein may include devices, systems, and methods for providing fifth generation (5G) quality of service (QoS) to 5G-capable user equipment (UE) devices with a 5G subscription. In one embodiment, a method is performed. A mobility management entity (MME) may determine a network capability. The MME may query a domain name server (DNS) for a plurality of candidate MMEs having the network capability. The MME may select a target MME from the plurality of candidate MMEs.

Example Embodiments

To provide 5G QoS, core nodes, such as a mobility management entity (MME), serving gateway (SGW), and/or packet data network (PDN) gateway (PGW), may be 5G capable. If one or more core nodes lacks 5G capability, 5G QoS may not be delivered, e.g., may be downgraded.

A 5G NSA capable MME may select a 5G NSA capable SGW and/or PGW. However, an evolved node B (eNB) device may not be capable of definitively selecting a 5G capable MME.

In some embodiments, an eNB entity may select a MME for which 5G NSA is not enabled. An initial UE message may be rerouted to redirect an attachment to a 5G NSA capable MME. This may ensure that the core nodes are 5G capable and that 5G QoS may be maintained.

In some embodiments, a source MME may select a target MME when the source MME is in a connected mode S1 handover operation. A 5G capable target MME may be selected when the existing session is in a 5G capable source MME.

Figure 1:
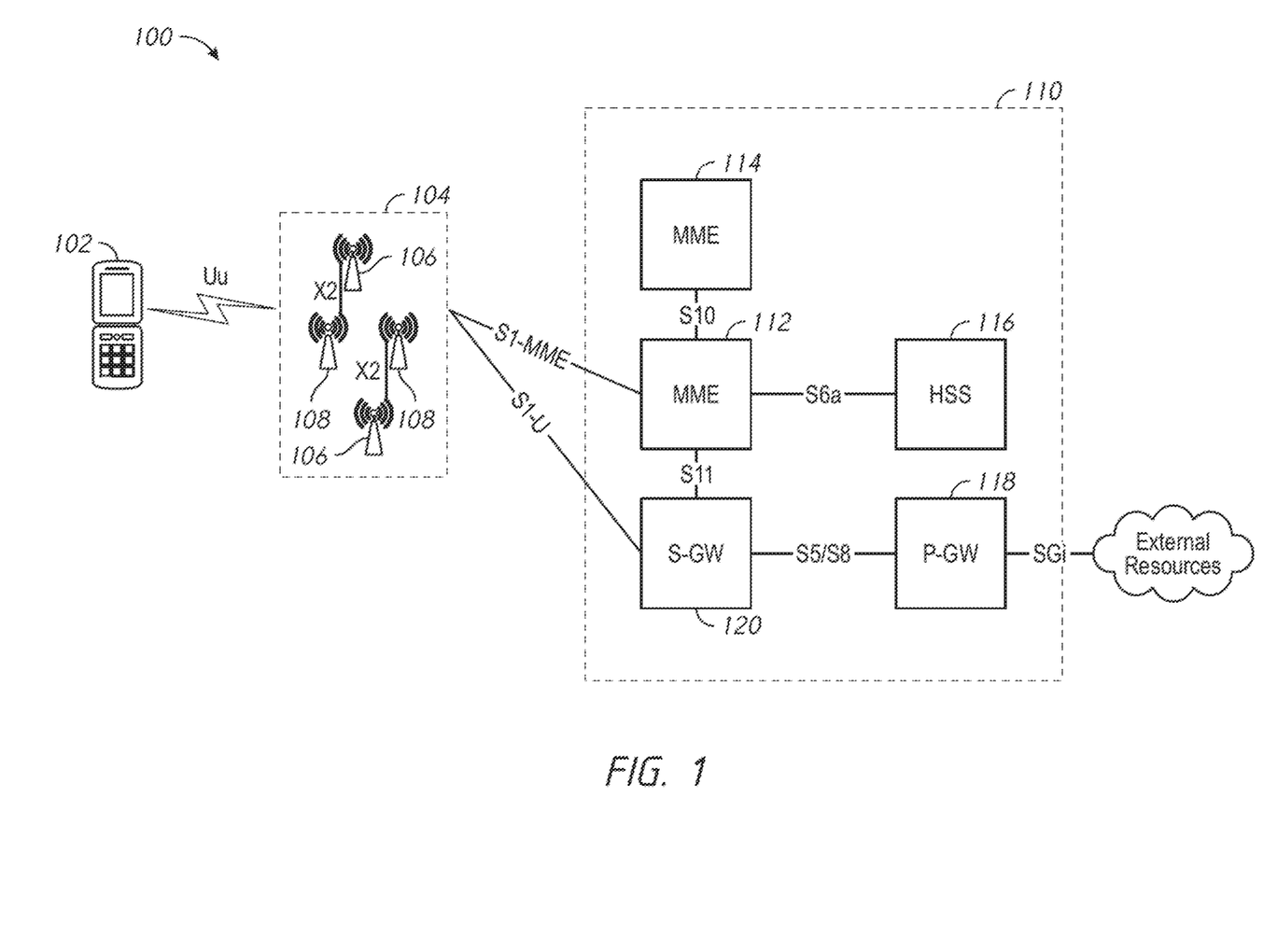
FIG. 1 is a diagram that illustrates an example network.

FIG. 1 illustrates an example long term evolution (LTE) network 100. The LTE network 100 may include a user equipment (UE) device 102, such as a mobile telephone. It will be appreciated that the LTE network 100 typically includes multiple UE devices 102; however, one UE device 102 is depicted for purposes of simplicity.

The LTE network 100 may include an access network, e.g., an evolved universal mobile telecommunications system (UMTS) terrestrial radio access network (E-UTRAN) 104. The UE device 102 may communicate with the E-UTRAN 104 via a Uu interface. The E-UTRAN 104 may include one or more eNodeB (eNB) entities 106. The E-UTRAN 104 may include one or more next generation NodeB (gNB) devices 108. The gNB entities 108 may be in communication with the one or more eNB entities 106 via one or more X2 interfaces.

The LTE network 100 may include a core network, e.g., an evolved packet core (EPC) network 110. The E-UTRAN 104 may communicate with the EPC network 110 using an S1 interface, which may include an S1-MME interface and/or an S1-U interface. The EPC network 110 may include one or more mobility management entities (MMEs) 112, 114. The MMEs 112, 114 may communicate with the E-UTRAN 104 via an S1-MME interface and may communicate with one another via an S10 interface. The MMEs 112, 114 may control high-level operation of the network using signaling messages and a home subscriber server (HSS) 116, with which they may communicate via an S6a interface. The HSS 116 may serve as a central database that may include information regarding the network operator's subscribers.

The EPC network 110 may also include a packet data network (PDN) gateway (PGW) 118. The PGW 118 may communicate with external resources, e.g., servers and/or packet data networks, via the SGi interface. A serving gateway (SGW) 120 may communicate with the MMEs 112, 114 using an S11 interface and with the E-UTRAN 104 using the S1-U interface. The SGW 120 may forward data between a base station and the PGW 118. The SGW 120 and PGW 118 may communicate with one another via an S5/S8 interface.

When the UE device 102 establishes a connection with the LTE network 100, one of the one or more eNB entities 106 may select an MME, e.g., the MME 112 or the MME 114, with which the UE device 102 may register. If the UE device 102 has fifth generation (5G) capability, it may publish its 5G capability in non-access stratum (NAS) messaging. An MME that has 5G non-standalone architecture (NSA) capability may extract the UE device capability information from the NAS messaging and may receive 5G subscription information for the subscriber from the HSS 116. A 5G capable MME may assist in establishing 5G sessions in the LTE network 100.

Figure 2:
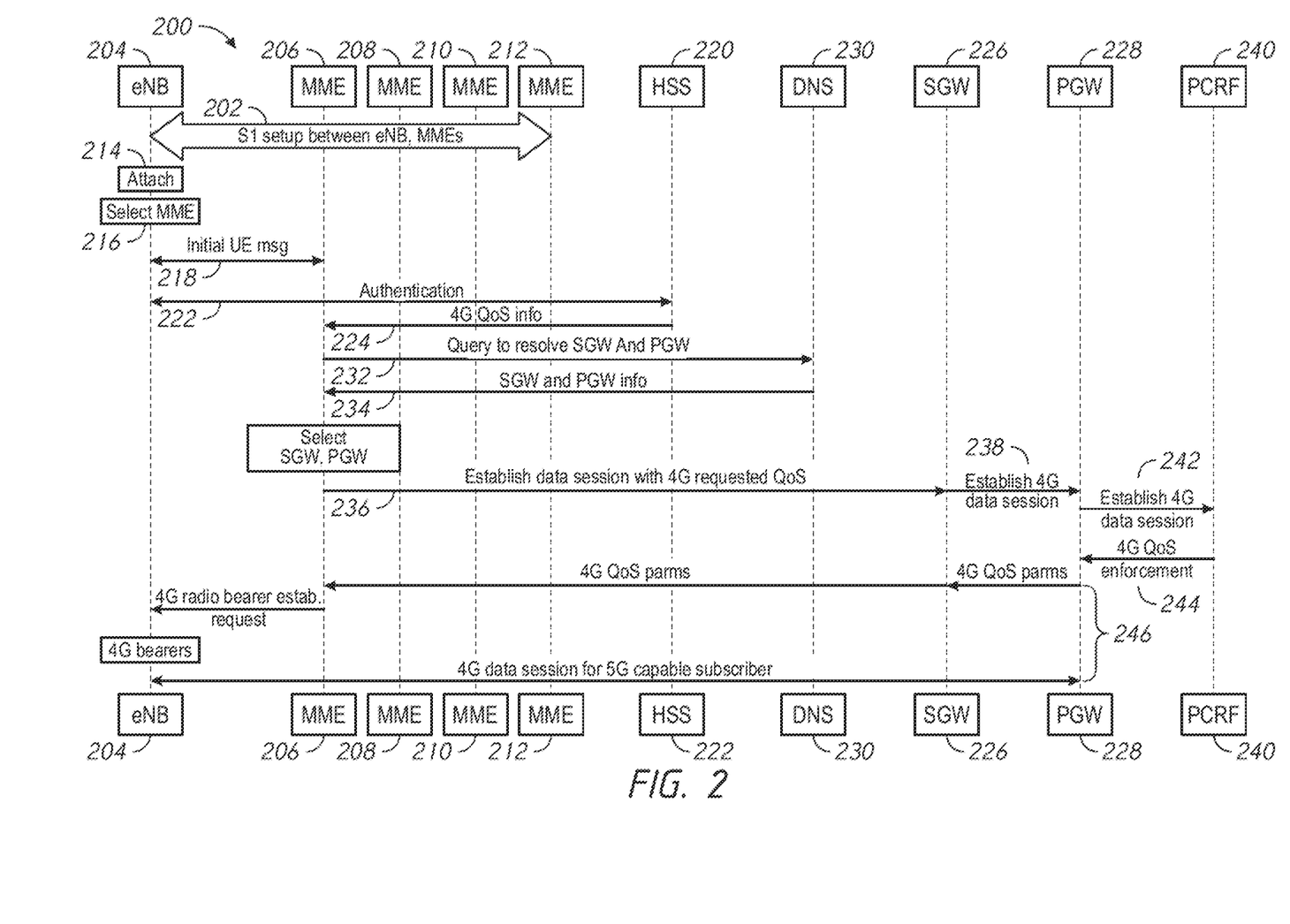
FIG. 2 is a flow diagram that illustrates an example process of establishing a data connection with a UE device that has fifth generation (5G) non-standalone (NSA) capability where, due to the nature of MME selection process, the 5G capable UE may not get 5G quality of service (QoS).

FIG. 2 illustrates an example process 200 of establishing a data connection with a UE device that has 5G NSA capability. At 202, an eNB entity 204 may perform setup procedures with MMEs 206, 208, 210, 212. For purposes of illustration, it may be assumed that MMEs 206, 208 lack 5G capability and that MMEs 210, 212 are 5G capable. The MMEs 206, 208, 210, 212 may have a stream control transmission protocol (SCTP) connection with the eNB entity 204 after the S1 setup procedures have been completed.

At 214, a 5G capable UE may initiate an attachment procedure. The UE device may disclose that it has 5G NSA capability, for example, in a payload of a non-access stratum (NAS) message. The eNB entity 204 may not be able to read the NAS message, however, and may not be aware that the UE device is 5G capable.

At 216, the eNB entity 204 may select an MME. The eNB entity 204 may select the MME based on weighted criteria. The eNB entity 204 may select the MME randomly. However, the eNB entity 204 may not be aware that the UE device is 5G capable. The eNB entity 204 may also not be aware of whether a particular MME is 5G capable. The eNB entity 204 may lack a capability to select a 5G capable MME during initial registration of the UE device with the network.

Accordingly, the eNB entity 204 may select an MME that is not 5G capable (e.g., the MME 206 or the MME 208) to handle the 5G capable UE device, even if 5G capable MMEs (e.g., the MME 210 or the MME 212) are present in the network. A UE device that is 5G capable may be handled by the selected MME, even if that MME is not 5G capable. In the example shown in FIG. 2, the eNB entity 204 may select the MME 206.

At 218, the eNB entity 204 may send the selected MME, e.g., the MME 206, an initial UE message that it may have received from the UE device. The initial UE message may include a NAS payload with 5G capability information.

The MME 206 may not be have 5G NSA enabled or implemented. The MME 206 may proceed with the attachment using 4G constructs. The eNB entity 204 and the MME 206 may perform an authentication procedure with an HHS 220 at 222. The MME 206 may not indicate its 5G support to the HSS 220.

At 224, the HSS 220 may return quality of service (QoS) information to the MME 206. For example, the HSS 220 may send 4G QoS information (e.g., only 4G QoS information) to the MME 206. The HSS 220 may not send 5G subscription information or 5G QoS information for the UE device because 5G support was not indicated.

The MME 206 may select a 4G capable SGW and/or PGW, e.g., an SGW 226 and a PGW 228. For example, the MME 206 may send a DNS 230 a query to resolve the SGW 226 and the PGW 228 at 232. At 234, the DNS 230 may reply with information for the SGW 226 and the PGW 228.

At 236, the MME 206 may establish a data session with the SGW 226. The MME 206 may request 4G QoS. At 238, the SGW 226 may establish a data session with the PGW 228, specifying 4G QoS as a requested QoS. The MME 206 may negotiate 4G QoS with a policy charging and rules function (PCRF) 240 at 242. 4G QoS may be enforced at 244.

At 246, session setup may be completed. 4G QoS parameters may be returned to the SGW 226 and the MME 206. The MME 206 may send the eNB entity 204 a request to establish 4G radio bearers. Accordingly, the MME 206 may handle the UE device with 4G QoS, even though the UE device may be 5G capable and may have a 5G subscription.

A domain name server (DNS) procedure may provide for selecting certain network nodes with NSA capability. For example, an MME may use a DNS procedure to discover and select a serving gateway control plane (SGW-C) and/or a PDN gateway control plane (PGW-C). The SGW-C may discover and select an NSA capable serving gateway user plane (SGW-U) using a DNS procedure. A PGW-C may discover and select an NSA capable PDN gateway user plane (PGW-U) using a DNS procedure. However, a DNS procedure may not provide a capability for an eNB entity to select an MME with NSA capability. A DNS procedure may not provide a capability for an MME to select a peer MME with NSA capability during an S1 handover.

In some embodiments, an MME may perform a DNS query to discover and select a 5G NSA capable peer MME. For example, when an MME sends a DNS query to find another MME, the MME may specify a service parameter, e.g., "+nc<network capability>", to filter the list received from the DNS server to obtain the address of a peer MME that is 5G NSA capable.

An NAS message may be redirected, for example, for a dedicated core (DECOR) feature. An MME that receives an initial UE message from an eNB entity may send the eNB entity a request to reroute the NAS message if a UE usage type requested in the initial UE message is not served by the MME. The eNB entity may redirect the initial UE message to an appropriate MME as may be indicated in the request to reroute the initial UE message. However, the eNB entity may lack a capability to reroute the initial UE message specifically to an NSA capable MME. In some embodiments, an MME may redirect a NAS message, e.g., an initial UE message, to a 5G NSA capable MME.

Figure 3A:
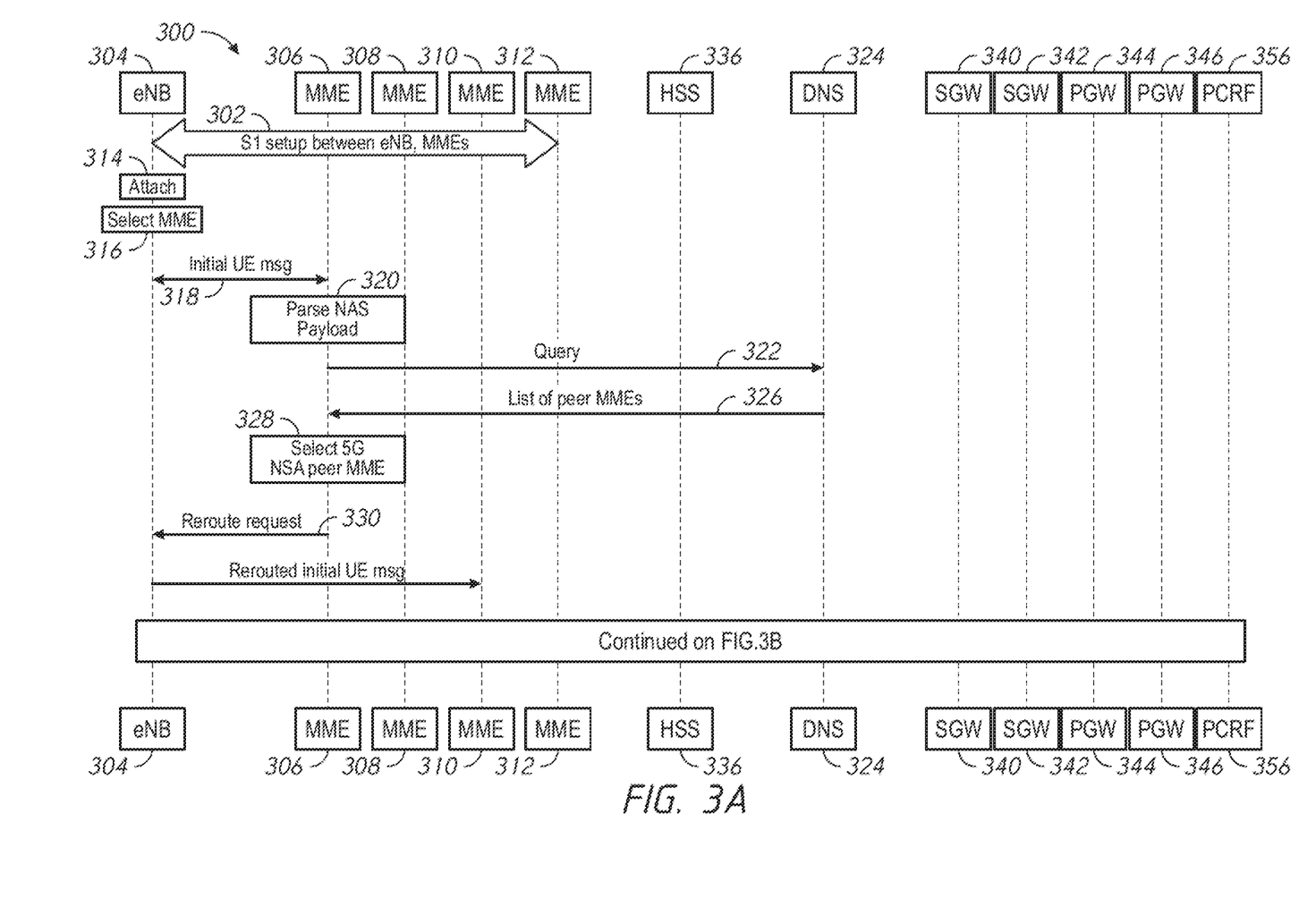
FIGS. 3A and 3B form a flow diagram that illustrates an example process of establishing a data connection with a UE device that has 5G NSA capability according to an embodiment where the MME selection is performed in a way to ensure 5G QoS to the UE device.
Figure 3B:
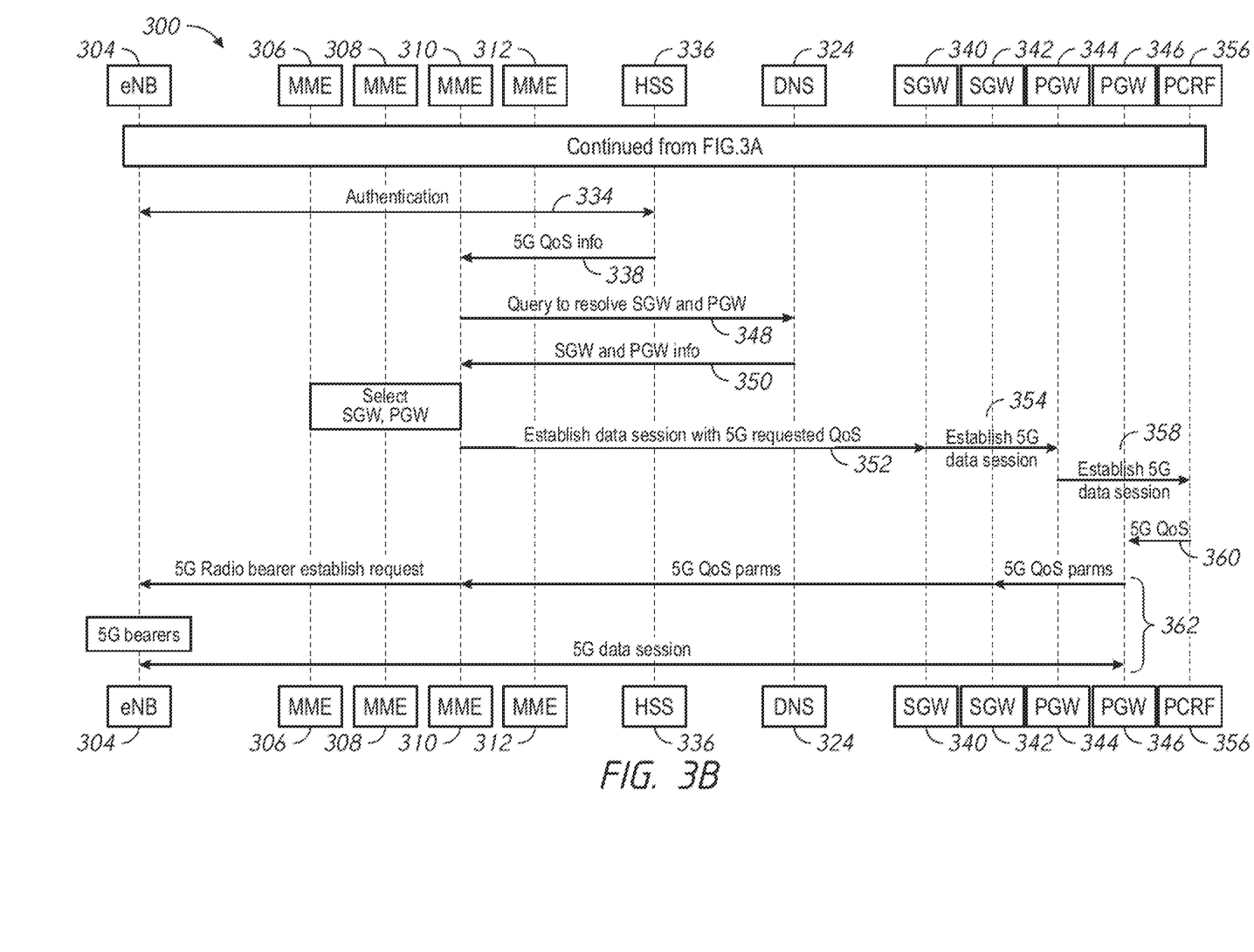

FIGS. 3A and 3B illustrate an example process 300 of establishing a data connection with a UE device that has 5G NSA capability according to an embodiment. At 302, an eNB entity 304 may perform setup procedures with MMEs 306, 308, 310, 312. For purposes of illustration, it may be assumed that MMEs 306, 308 lack 5G capability and that MMEs 310, 312 are 5G capable. The MMEs 306, 308, 310, 312 may have a SCTP connection with the eNB entity 304 after the S1 setup procedures have been completed.

At 314, a 5G capable UE device may initiate an attachment procedure. The UE device may disclose that it has 5G NSA capability, for example, in a payload of a NAS message. The eNB entity 304 may not be able to read the NAS message, however, and may not be aware that the UE device is 5G capable.

At 316, the eNB entity 304 may select an MME. The eNB entity 304 may select the MME based on weighted criteria.

The eNB entity 304 may select the MME randomly. However, the eNB entity 304 may not be aware that the UE device is 5G capable. The eNB entity 304 may also not be aware of whether a particular MME is 5G capable. The eNB entity 304 may lack a capability to select a 5G capable MME during initial registration of the UE device with the network.

Accordingly, the eNB entity 304 may select an MME that is not 5G capable (e.g., the MME 306 or the MME 308) to handle the 5G capable UE device, even if 5G capable MMEs (e.g., the MME 310 or the MME 312) are present in the network. A UE device that is 5G capable may be handled by the selected MME, even if that MME is not 5G capable. In the example shown in FIG. 3, the eNB entity 304 may select the MME 306.

At 318, the eNB entity 304 may send the selected MME, e.g., the MME 306, an initial UE message that it may have received from the UE device. The initial UE message may include a NAS payload with 5G capability information.

At 320, the MME 306 may parse the NAS payload. The MME 306 may determine based on the NAS payload that the UE device is 5G NSA capable. Because the MME 306 is not 5G NSA capable, it may perform a DNS query to identify a 5G NSA capable MME, e.g., the MME 310 or the MME 312. At 322, the MME 306 may generate and send a query to a DNS 324 to look up the DNS 324 for a peer MME. The query may be a DNS service naming authority pointer (SNAPTR) query. The DNS 324 may respond to the query at 326 with a list of candidate peer MMEs, e.g., the MMEs 308, 310, 312.

The query may specify a service parameter for a desired network capability, e.g., "+nc<network capability>". For example, a service parameter may specify "+nc-nr" to obtain a list of MMEs that are 5G NSA capable, e.g., the MMEs 310, 312 in the example shown in FIGS. 3A and 3B. The service parameter "+nc-nr" may filter out the MME 308, which is not 5G NSA capable in the example shown in FIGS. 3A and 3B.

At 328, the MME 306 may select a 5G NSA capable MME from the returned and filtered list of peer MMEs. For example, the MME 306 may select the MME 310. The MME 306 may then reroute the initial UE message to the selected MME, e.g., the MME 310. At 330, the MME 306 may send the eNB entity 304 a NAS reroute request message designating the selected MME as the new destination of the rerouted message. The reroute request message may include details relating to the selected MME. At 332, the eNB entity 304 may reroute the initial UE message to the selected MME, e.g., the MME 310.

Referring now to FIG. 3B, at 334, the eNB entity 304 and the MME 310 may perform an authentication procedure with an HHS 336. The MME 310 may indicate its 5G support to the HSS 336. At 338, the HSS 336 may return quality of service (QoS) information to the MME 310. For example, the HSS 336 may send extended 5G QoS information to the MME 310.

The MME 310 may select a 5G capable SGW and/or PGW. In the example shown in FIGS. 3A and 3B, the network may include an SGW 340 that is not 5G capable and an SGW 342 capable of 5G. The network may include a PGW 344 that is not 5G capable and a PGW 346 capable of 5G. For example, the MME 310 may send the DNS 324 a query to resolve the SGW 342 and the PGW 346 at 348. At 350, the DNS 324 may reply with information for the 5G capable SGW 342 and the PGW 346 capable of 5G.

At 352, the MME 310 may establish a data session with the SGW 342. The MME 310 may request 5G QoS. At 354, the SGW 342 may establish a data session with the PGW 346, specifying 5G QoS as a requested QoS. The MME 310 may negotiate 5G QoS with a policy charging and rules function (PCRF) 356 at 358. 5G QoS may be enforced at 360.

At 362, session setup may be completed. 5G QoS parameters may be returned to the SGW 342 and the MME 310. The MME 310 may send the eNB entity 304 a request to establish 5G radio bearers. Accordingly, the MME 310 may handle the UE device with 5G QoS.

In a handover situation, a UE device 102 capable of 5G may be connected to the LTE network 100 of FIG. 1 and may be served by an MME. The UE device 102 may move to a different location that may not be served by the current MME. When the current MME is preparing to handover management of the UE device 102 to another MME that serves the new location of the UE device 102, the current MME, e.g., a source MME, may select a target MME for the handover. A source MME that is 5G NSA capable may lack a capability to select a target MME that is capable of anchoring the 5G sessions of the subscriber.

Figure 4:
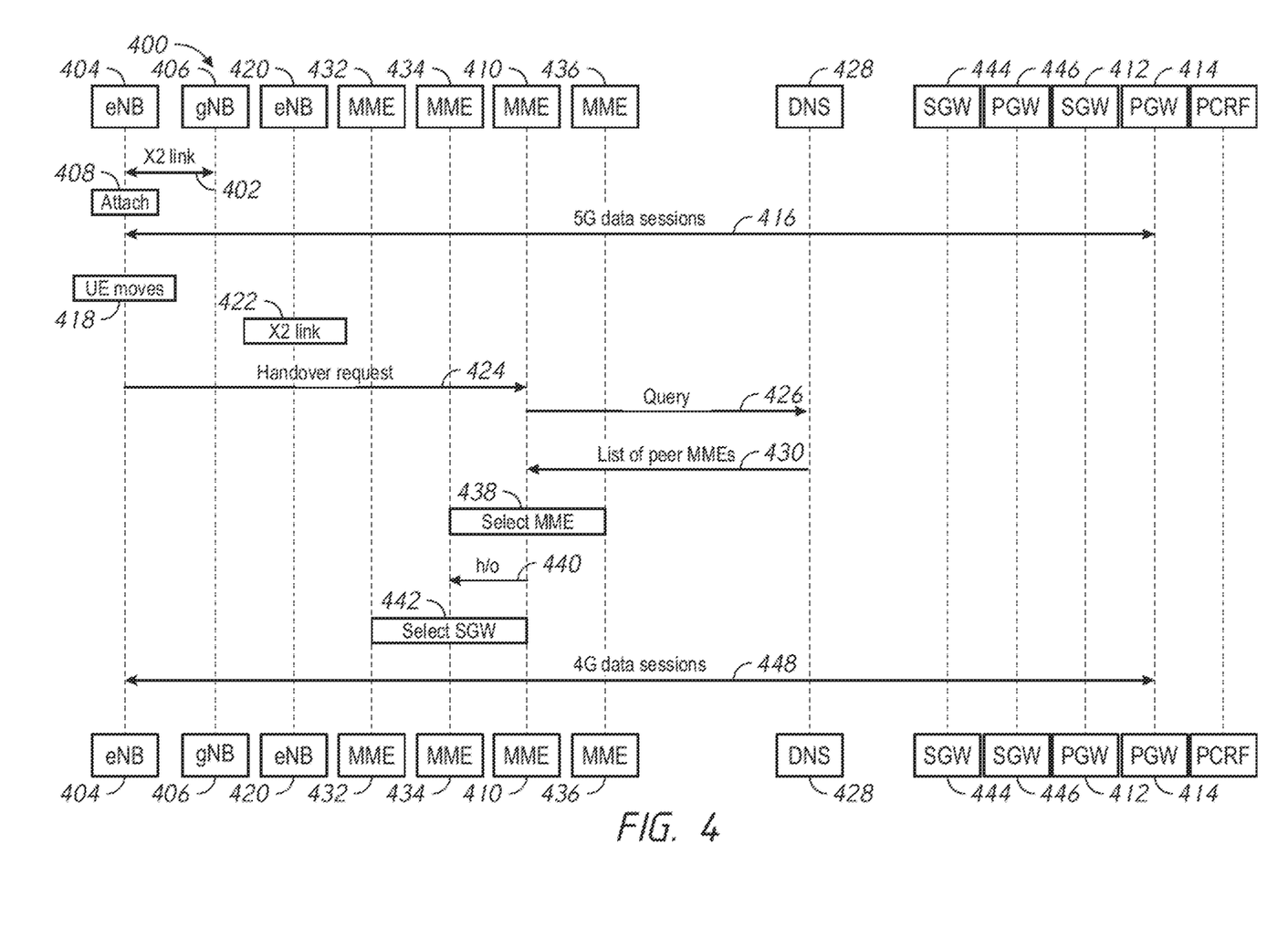
FIG. 4 is a flow diagram that illustrates an example process of performing a handover of a data connection with a UE device where due to the nature of MME selection process during handover, the 5G-capable UE device may not get 5G QoS post-handover.

FIG. 4 illustrates an example process 400 of performing a handover of a data connection with a UE device. At 402, an eNB entity 404 may establish a connection, e.g., over a X2 link, with a next generation gNodeB (gNB) entity 406 to handle 5G data sessions.

At 408, a 5G capable UE device may initiate an attachment procedure. 5G data sessions may be established for a 5G capable subscriber with 5G capable nodes in the network, which may include, for example, an MME 410, an SGW 412, and/or a PGW 414 at 416.

At 418, the UE device may move to a different location that may be served by a target eNB entity 420. At 422, the target eNB entity 420 may have a 5G capable gNB device connected to it via a X2 link. At 424, the UE device may initiate an S1 handover request to the MME 410. If the new location of the UE device is not served by the MME 410, a new MME may be selected for a handover.

At 426, the MME 410, e.g., a source MME, may generate and send a query to a DNS 428 to look up the DNS 428 for a peer MME. The query may be a DNS service naming authority pointer (SNAPTR) query. The DNS 428 may respond to the query at 430 with a list of peer MMEs serving the current tracking area, e.g., MMEs 432, 434, 436. In the example shown in FIG. 4, the MMEs 432, 434 may lack 5G capability. The MME 436 may be 5G capable.

At 438, the MME 410 may select a target MME from the list received from the DNS 428. This selection may be made randomly or based on weighted criteria, for example. The MME 410 may lack a capability to select a target MME that is 5G capable, even if the MME 410 is itself 5G capable. Accordingly, the MME 410 may select a target MME that is not 5G capable, such as the MME 434 in the example shown in FIG. 4.

At 440, the MME 410 may initiate a handover of the data session to the MME 434. The handover message may include 5G data session details. At 442, the MME 434 may select an SGW to handle the data session. Because the MME 434 may lack 5G capability, it may select an SGW that also lacks 5G capability. In the example shown in FIG. 4, an SGW 444 may lack 5G capability and may be selected. During the handover procedure, the MME 434 may send downgraded 4G QoS to the SGW 444. Accordingly, the modify bearer request (MBR) sent to the selected PGW, whether the PGW is a PGW 446 that lacks 5G capability or the 5G capable PGW 414, may have the downgraded 4G QoS. The data session may be downgraded to 4G QoS at 448, even though some of the nodes (e.g., the UE device, the target eNB entity 420, and/or the PGW 414) may be 5G capable.

Figure 5:
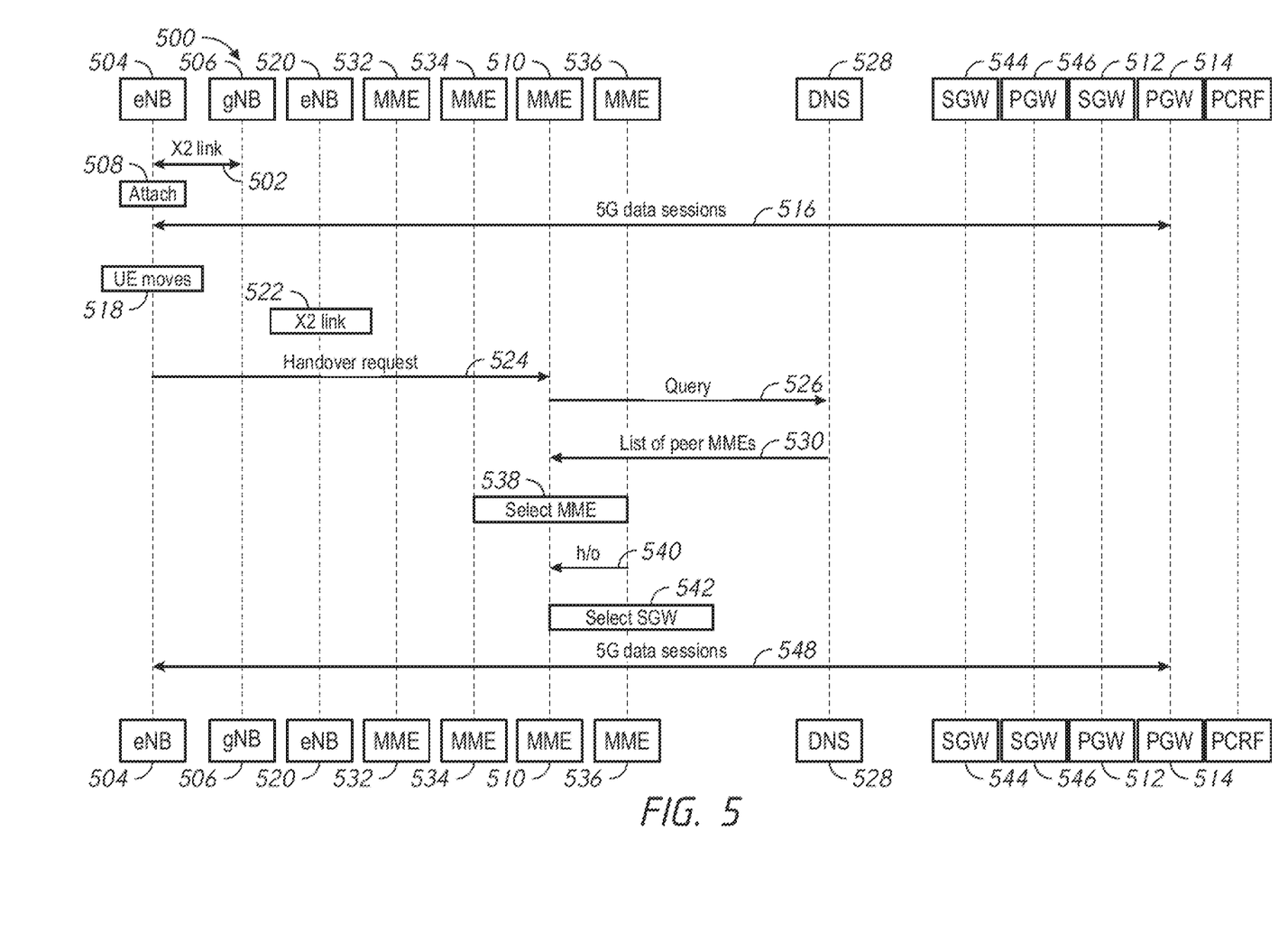
FIG. 5 is a flow diagram that illustrates an example process of performing a handover of a data connection with a UE device that has 5G NSA capability according to an embodiment where the MME selection during handover is performed in a way to ensure 5G QoS to the UE device after handover.

FIG. 5 illustrates an example process 500 of performing a handover of a data connection with a UE device that has 5G NSA capability according to an embodiment. At 502, an eNB entity 504 may establish a connection, e.g., over a X2 link, with a next generation gNodeB (gNB) entity 506 to handle 5G data sessions.

At 508, a 5G capable UE device may initiate an attachment procedure. 5G data sessions may be established for a 5G capable subscriber with 5G capable nodes in the network, which may include, for example, an MME 510, an SGW 512, and/or a PGW 514 at 516.

At 518, the UE device may move to a different location that may be served by a target eNB entity 520. At 522, the target eNB entity 520 may have a 5G capable gNB device connected to it via a X2 link. At 524, the UE device may initiate an S1 handover request to the MME 510. If the new location of the UE device is not served by the MME 510, a new MME may be selected for a handover.

At 526, the MME 510, e.g., a source MME, may generate and send a query to a DNS 528 to look up the DNS 528 for a peer MME. The query may be a DNS service naming authority pointer (SNAPTR) query. The DNS 528 may respond to the query at 530 with a list of candidate peer MMEs serving the current tracking area, e.g., MMEs 532, 534, 536. In the example shown in FIG. 5, the MMEs 532, 534 may lack 5G capability. The MME 536 may be 5G capable.

The query may specify a service parameter for a desired network capability, e.g., "+nc<network capability>". For example, a service parameter may specify "+nc-nr" to obtain a list of MMEs that are 5G NSA capable, e.g., the MMEs 510, 536 in the example shown in FIG. 5. The service parameter "+nc-nr" may filter out the MMEs 532, 534, which are not 5G NSA capable in the example shown in FIG. 5. In some embodiments, an operator may configure the DNS 528 with the service parameters against each MME entry.

At 538, the MME 510 may select an MME from the filtered list returned by the DNS 528. For example, the MME 510 may select the MME 536 for the handover operation. At 540, the MME 510 may initiate a handover of the data session to the selected MME, e.g., the MME 536. The handover message may include 5G data session details. At 542, the MME 536 may select a SGW to handle the data session. Because the MME 536 is 5G capable, it may select an SGW that also has 5G capability. In the example shown in FIG. 5, an SGW 544 may lack 5G capability and may not be selected. The SGW 512 may be 5G capable and may be selected. During the handover procedure, the MME 536 may send 5G QoS to the SGW 512. A 5G capable PGW may also be selected. In the example shown in FIG. 5, a PGW 546 may lack 5G capability and may not be selected. The PGW 514 may be 5G capable and may be selected. With the MME 536, the SGW 512 and the PGW 514 selected, the MBR sent to the PGW 514 may have the same 5G QoS as the data session before the handover operation, and the data session may be continued with 5G QoS at 548.

Figure 6:
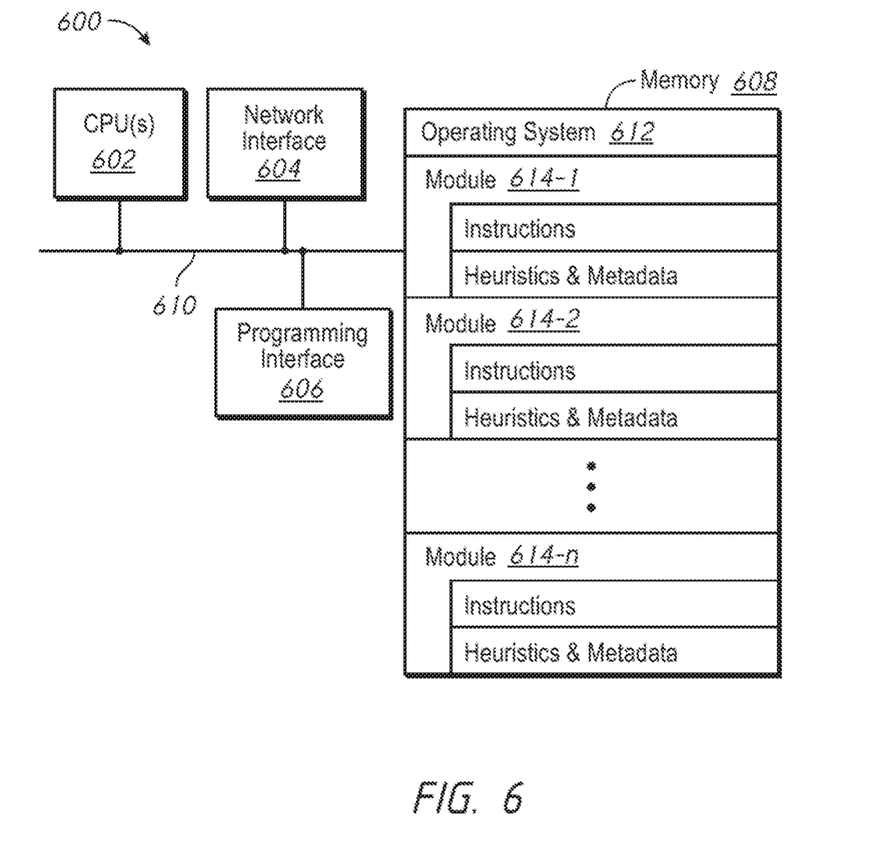
FIG. 6 is a block diagram that illustrates an example server system.

FIG. 6 is a block diagram of an example server system 600 enabled with one or more components of a device, server, or system in accordance with some embodiments. While certain specific features are illustrated, those of ordinary skill in the art will appreciate from the present disclosure that various other features have not been illustrated for the sake of brevity, and so as not to obscure more pertinent aspects of the embodiments disclosed herein. To that end, as a non-limiting example, in some embodiments the server system 600 may include one or more processing units (CPUs) 602, a network interface 604, a programming interface 606, a memory 608, and one or more communication buses 610 for interconnecting these and various other components.

The network interface 604 may be provided to, among other uses, establish and/or maintain a metadata tunnel between a cloud-hosted network management system and at least one private network including one or more compliant devices. In some embodiments, the one or more communication buses 610 may include circuitry that interconnects and controls communications between system components. The memory 608 may include one or more of high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. The memory 608 may include one or more storage devices remotely located from the one or more CPUs 602. The memory 608 may comprise a non-transitory computer readable storage medium.

In some embodiments, the memory 608 or the non-transitory computer readable storage medium of the memory 608 may include (e.g., store) the following programs, modules, and data structures, or a subset thereof including one or more of an operating system 612 or various modules 614-1, 614-2, . . . , 614-n. The modules 614-1, 614-2, . . . , 614-n, individually and/or collectively, perform one or more of the operations described herein. To that end, in various embodiments, the modules 614-1, 614-2, . . . , 614-n may include respective instructions and/or logic, and heuristics and metadata.

Various aspects of embodiments within the scope of the appended claims are described above. It should be apparent that the various features of embodiments described above may be embodied in a wide variety of forms and that any specific structure and/or function described above is merely illustrative. Based on the present disclosure, one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   determining, at a mobility management entity (MME), a network capability of a user equipment (UE), wherein the network capability is obtained by the MME from the UE and the network capability is a fifth generation (5G) non-standalone architecture (NSA) network capability of the UE;
   querying a domain name server (DNS) for a plurality of candidate MMEs having the network capability obtained from the UE, wherein the querying includes a service parameter identifying the network capability; and
   selecting a target MME from the plurality of candidate MMEs.

2. The method of claim 1, further comprising:
   obtaining, at the MME, an initial UE message from an evolved node B (eNB) device; and
   determining the network capability of the UE based on the initial UE message.

3. The method of claim 2, wherein the initial UE message comprises a non-access stratum (NAS) payload, and wherein the method further comprises:
   parsing the NAS payload; and
   determining the network capability of the UE based on the NAS payload.

4. The method of claim 2, further comprising sending the eNB device a request to redirect the initial UE message to the target MME.

5. The method of claim 1, method further comprising:
   obtaining, at the MME, a handover request for the UE.

6. The method of claim 1, wherein querying the DNS comprises generating a DNS service naming authority pointer (SNAPTR) query.

7. The method of claim 6, wherein the DNS SNAPTR query comprises a filter to filter out at least one of the plurality of candidate MMEs that does not have the network capability.

8. A device comprising:
   a network interface in communication with a network;
   a processor configured to execute computer readable instructions included on a non-transitory memory; and
   a non-transitory memory including processor-readable instructions, that when executed by the processor, cause the device to
   determine a network capability of a user equipment (UE), wherein the network capability is obtained by the device from the UE and the network capability is a fifth generation (5G) non-standalone architecture (NSA) network capability of the UE;
   query a domain name server (DNS) for a plurality of candidate mobility management entities (MMEs) having the network capability obtained from the UE, wherein the query includes a service parameter identifying the network capability; and
   select a target MME from the plurality of candidate MMEs.

9. The device of claim 8, wherein the processor-readable instructions, when executed by the processor, cause the device to:
   obtain an initial UE message from an evolved node B (eNB) device; and
   determine the network capability of the UE based on the initial UE message.

10. The device of claim 9, wherein the initial UE message comprises a non-access stratum (NAS) payload, and wherein the processor-readable instructions, when executed by the processor, cause the device to:
    parse the NAS payload; and
    determine the network capability of the UE based on the NAS payload.

11. The device of claim 9, the processor-readable instructions, when executed by the processor, cause the device to send the eNB device a request to redirect the initial UE message to the target MME.

12. The device of claim 8, wherein the processor-readable instructions, when executed by the processor, cause the device to:
    obtain a handover request for the UE.

13. The device of claim 8, wherein querying the DNS comprises generating a DNS service naming authority pointer (SNAPTR) query.

14. The device of claim 13, wherein the DNS SNAPTR query comprises a filter to filter out at least one candidate MME that does not have the network capability.

15. The device of claim 8, wherein the device comprises a mobility management entity (MME).

16. A non-transitory computer readable storage medium storing one or more programs, the one or more programs comprising instructions that, when executed by a computing device with a non-transitory memory and one or more processors, cause the computing device to perform or cause performance of:
    determining a network capability of a user equipment (UE), wherein the network capability is obtained by the computing device from the UE and the network capability is a fifth generation (5G) non-standalone architecture (NSA) network capability of the UE;
    querying a domain name server (DNS) for a plurality of candidate mobility management entities (MMEs) having the network capability obtained from the UE, wherein the querying includes a service parameter identifying the network capability; and
    selecting a target MME from the plurality of candidate MMEs.

17. The non-transitory computer readable storage medium of claim 16, wherein the instructions, when executed by the computing device, cause the computing device to perform or cause performance of:
    obtaining an initial UE message from an evolved node B (eNB) device; and determining the network capability of the UE based on the initial UE message.

18. The non-transitory computer readable storage medium of claim 16, wherein the instructions, when executed by the computing device, cause the computing device to perform or cause performance of:

obtaining a handover request for the UE.

19. The non-transitory computer readable storage medium of claim 16, wherein querying the DNS comprises generating a DNS service naming authority pointer (SNAPTR) query.

20. The non-transitory computer readable storage medium of claim 19, wherein the DNS SNAPTR query comprises a filter to filter out at least one of the plurality of candidate MMES that does not have the network capability.

* * * * *